United States Patent Office 3,546,181
Patented Dec. 8, 1970

---

3,546,181
THERMALLY STABLE POLYMER PREPARED BY REACTING AN AROMATIC TETRACARBOXYLIC ACID WITH A TETRAAMINO PYRENE DERIVATIVE
Fred E. Arnold, Dayton, Ohio, assignor to the United States of America as represented by the Secretary of the Air Force
No Drawing. Filed Apr. 16, 1969, Ser. No. 816,839
Int. Cl. C08g 20/20
U.S. Cl. 260—78        12 Claims

ABSTRACT OF THE DISCLOSURE

This invention comprises new thermally stable polymeric compositions, starting compounds and intermediates and methods for preparing the same. The polymers are prepared by the condensation of an aromatic tetraacid, such as 1,4,5,8-naphthalene tetracarboxylic acid, and a tetraamino fused ring compound, namely 2,3,11,12-tetraamino-diquinoxal(2,3-e, 2'3'-1)pyrene. This fused ring tetraamino compound is prepared by the reaction of 1,2-ditosylate of 1,2,4,5-tetraaminobenzene with 1,2,6,7-tetraketopyrene to give a tetratosylated derivative which after treatment with concentrated $H_2SO_4$ followed by base gives the desired fused ring tetraamino compound. The tetratosylate and the tetraamino fused ring compound and the ditosylated tetraamino benzene intermediate are new compounds. The latter can be prepared by the reduction of 1,2-dinitro-4,5-(p-toluene sulfamido)-benzene. With appropriate tetraacids or their derivatives and with sufficient reaction of the reagents, ladder polymers can be formed.

---

The invention described herein may be manufactured and used by or for the U.S. Government for governmental purposes without payment to me of any royalty therein.

BACKGROUND OF THE INVENTION

Field of the invention

The present invention relates to new thermally stable compositions of matter and to the methods of synthesizing the same.

The prior art is constantly searching for materials having high temperature properties, i.e., the ability to retain their physical and chemical characteristics as well as their dimensional stability at elevated temperatures in the order of 500° C. and above. Such materials have particular utility in a variety of aerospace applications such as on the skin or leading edges of high speed aircraft, the nose cone and heat shields of atmospheric escape and re-entry vehicles, various rocket engine components and the like. Numerous polyaromatic-heterocyclic polymers such as the polybenzimidazoles, the polyimides and the polybenzoxazoles, all of which possess hetercyclic nitrogen, are known to have good thermal stability, at least upon exposure to temperatures of approximately 500° C. in inert atmospheres. While these materials are of use in the applications above indicated and in other applications wherein high temperature environments are anticipated, the need continues for additional materials having varied properties which can nonetheless withstand prolonged exposure to high temperatures; and the search is constantly underway for materials which are capable of withstanding even higher temperatures.

It is acordingly an object of this invention to provide new and improved thermally stable compositions which will not physically or chemically deteriorate upon exposure to high temperatures in the order of 500° C. and above in inert atmospheres.

Another object of this invention is to provide methods for synthesizing such materials, as well as intermediate compounds used in such preparations.

Description of the prior art

Dawans and Marvel, J. Polymer Science, A3, 3549, (1965), have disclosed the preparation of polymers by the condensation of 1,4,5,8-tetraaminonaphthalene and 1,2,4,5-tetraaminobenzene with pyromelletic anhydride.
Bell and Pezdirtz, J. Polymer Science, B3, 977 (1965), and Colson et al., J. Polymer Science, (A–1), 4, 59 (1966), have also disclosed preparation of polymers by the condensation of 1,2,4,5-tetraaminobenzene with pyromelletic acid anhydride.

However such polymers have not been completely satisfactory with regard to thermal stability and other properties.

SUMMARY OF THE INVENTION

The various objects cited above and other advantages are achieved by the polycondensation of aromatic tetraacids, or derivatives thereof, with a new tetraamino fused ring compound, namely 2,3,11,12-tetraamino-diquinoxal-(2,3-e, 2',3'-1)pyrene.

The tetraamino fused ring compound of this invention is prepared by the condensation of the 1,2-ditosylate of 1,2,4,5-tetraaminobenzene with 1,2,6,7-tetraketopyrene, followed by acid and base treatment. The ditosylate of the tetraaminobenzene is likewise a new compound and is prepared by the hydrogenation of 1,2-dinitro-4,5-(p-toluene sulfamido)benzene by chemical reduction with sodium hydrosulfite.

The condensation reaction for production of the polymer is illustrated schematically as follows:

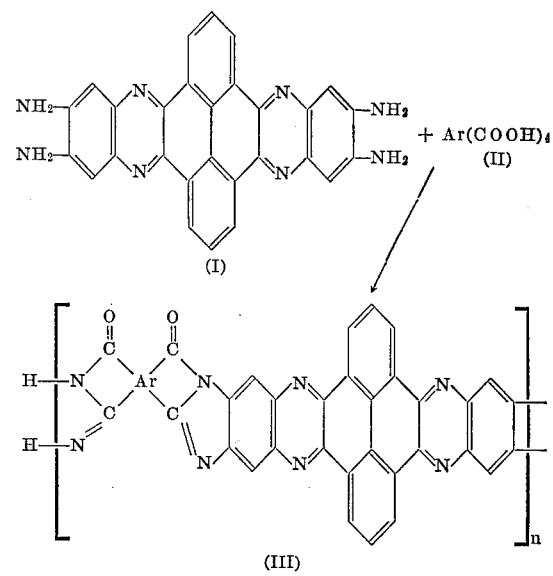

The Ar(COOH)$_4$ represents various aromatic tetraacids in which the Ar nucleus can be benzene, naphthalene and pyrene, which non-rotatable nuclear structures can give ladder polymers, whereas other tetraacids that can be used such as diphenyl tetraacid can give less rigid structures not of the ladder type. Moreover, in intermediate structures, where only a minor number of the pairs of functional groups are completely reacted, the structures may be non-ladder. However when the major portion of the acid and amino groups have condensed to form additional ring structures, the resulting polymers assume the properties characteristic of ladder polymers, namely resistance to heat and chemicals.

The preparation of the intermediates used in preparing the new tetraamino fused ring compound of this invention is represented as follows:

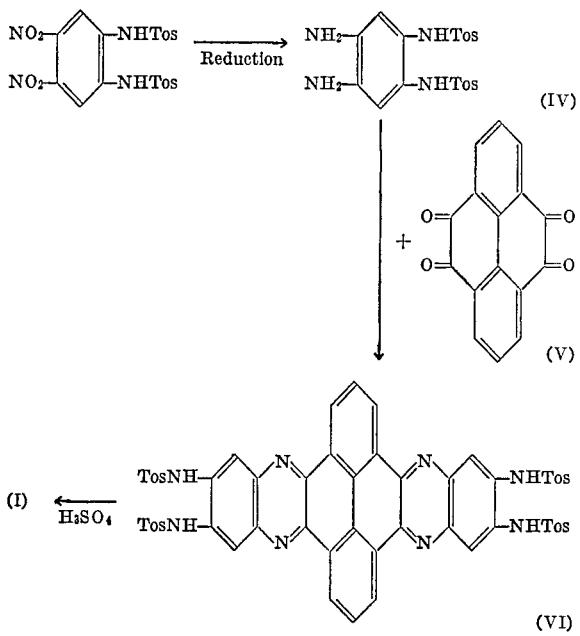

The expression "tosylate," sometimes abbreviated as "Tos," is intended to include in addition to the toluene sulfonamide derivatives, other aromatic as well as aliphatic and cycloaliphatic sulfonamide derivatives. The aromatic, cycloaliphatic and aliphatic nuclei can have various hydrocarbon radicals substituted thereon, and the aromatic nuclei can also have halogen atoms, e.g. chlorine, bromine, iodine and fluorine, substituted thereon. Advantageously the hydrocarbon portion has no more than 20 carbon atoms therein, since larger groups, while still reactive for this purpose, react more sluggishly.

Typical sulfonamide derivative groups are those in which the radical to which the sulfonamide is attached are phenyl, tolyl, xylyl, naphthyl, diphenyl, methylnaphthyl, benzyl, chlorophenyl, bromophenyl, iodophenyl, fluorophenyl, chloronaphthyl, chlorodiphenyl, methyl, ethyl, propyl, amyl, octyl, decyl, dodecyl, octadecyl, cyclohexyl, cycloheptyl, methylcyclohexyl, ethylcycloheptyl, and the like.

The sulfonamide derivative groups can be introduced by any means convenient, but is preferably attached by reaction of the amino groups with the appropriate sulfonyl chloride, such as toluene sulfonyl chloride, benzene sulfonyl chloride, xylyl sulfonyl chloride, naphthyl sulfonyl chloride, methyl sulfonyl chloride, propyl sulfonyl chloride, cyclohexyl sulfonyl chloride, and the like.

The polymer condensation reaction is preferably carried out in polyphosphoric acid, in which case the tetraamino compound can be in the form of the free amine or in the form of the tosylate or inorganic acid salt forms of the amine, such as the hydrochloride, the phosphate, sulfate, and the like.

Other reaction media can be used, such as "aprotic" solvents, which are strong solvents such as dimethyl formamide, dimethyl acetamide, hexamethyl phosphoramide, tetramethyl urea, dimethyl sulfoxide, and the like. However when such aprotic solvents are used as the reaction media, the tetraamino fused ring compound should be in the free amine form instead of the tosylate or acid salt forms that can be used with the polyphosphoric acid.

In preparing the condensation polymers of this invention, the tetraacid and the tetraamino reagents are advantageously used in equimolar amounts, although a small excess of one or the other reagent will not adversely affect the polymerization. However, considerable excess of one of the reagents will result in smaller molecular weight products. Generally at least two and preferably at least four of the type of repeating units described herein are desired in the polymer chain, with greater number being produced upon prolonged reaction.

The temperature is advantageously in the range of 30–200° C. and generally a reaction period of at least 8 hours, depending on the particular temperature, is desirable to effect a substantial conversion to polymer.

As previously indicated, the tetratosylate of the fused ring tetraamino compound used in the polymerization is prepared by the reaction of 1,2,6,7-tetraketopyrene with 1,2-diamino-4,5-(p-toluene-sulfamido)benzene. This reaction is advantageously carried out in an anhydrous inert medium such as glacial acetic acid in an inert atmosphere. The temperature is in the range of 0–100° C., preferably 30–80° C., and the reaction is conducted until a substantial yield of the desired product has been precipitated, which is generally 6 hours or more depending upon the particular temperature. The product is in the form of the tetratosylate, and if desired the free amine can be produced by addition to a concentrated sulfuric acid solution and after sufficient period for reaction, the solution is cooled to 0° C. and poured over ice to precipitate the free amine which is further washed with deoxygenated water, then with deoxygenated 20% ammonium carbonate solution, again with deoxygenated water, dried under reduced pressure, and recrystallized from a solvent such as dimethyl acetamide to give a light yellow solid.

The 1,2-ditosylate of 1,2,4,5-tetraaminobenzene is prepared by the catalytic or chemical reduction of the ditosylate of 1,2-diamino-4,5-dinitrobenzene, which is prepared by the reaction of the corresponding diamino-dinitrobenzene with toluene sulfonyl chloride or other appropriate sulfonyl chloride. The reduction is advantageously effected by the gradual addition under nitrogen of an aqueous solution of sodium hydrosulfite. The dinitro compound is advantageously reacted in solution in a solvent such as dimethyl acetamide. The reaction temperature is advantageously in the range of 70–110° C. for a period of approximately 1–3 hours. However temperatures as low as room temperature, or even 0° C., can also be used, in which case prolonged reaction times are required for substantial conversion. While higher temperatures than those indicated can be used, violent reactions may result, and the indicated temperatures are preferred since reaction is sufficiently rapid at those temperatures.

SPECIFIC EMBODIMENTS OF THE INVENTION

The invention is illustrated by the following examples. These examples are intended merely for illustrative purposes and are not intended to limit the scope of the invention nor the manner in which it may be practiced. Unless specifically provided otherwise, reference to parts and percentages are by weight.

EXAMPLE I 1,2-diamino-4,5-(p-toluenesulfamido)benzene

To a solution of 15.2 g. (30.0 mmoles) of 1,2-dinitro-4,5-(p-toluenesulfamido)benzene in 150 ml. of dimethylacetamide at 90° C. there is added dropwise, under nitrogen, an aqueous solution 31.3 g. (180.0 mmoles) of sodium hydrosulfite. After the addition is complete, the temperature is maintained at 90° C. for two hours. The cooled reaction mixture is added to 500 ml. of deoxygenated water to precipitate a white solid. The material is collected, washed with water, and recrystallized from methanol to afford 8.5 g. (63%) of the product, M.P. 238–239° C. Analyses show: C, 53.83; H, 5.02; N, 12.46; as compared to theoretical values for $C_{20}H_{22}N_4O_4$ of: C, 53.79; H, 4.96; N, 12.54.

EXAMPLE II 2,3,11,12-tetra(p-toluenesulfamide)-diquinoxal-(2,3-e, 2′,3′-1)pyrene To a solution of 8.93 g. (20.0 mmoles) of 1,2-diamino-4,5-(p-toluenesulfamido)benzene in 250 ml. of glacial acetic acid there is added 2.62 g. (10.0 mmoles) of 1,2,6,7-tetraketopyrene. The solution is stirred at 60° C. under a nitrogen atmosphere, for eight hours. The yellow precipitate is collected, washed with water, and recrystallized from dimethylacetamide to afford 8.90 g. (82%) of the product, M.P. >300° C. Analyses show: C, 62.04; H, 3.90; N, 10.17; as compared to theoretical values for $C_{56}H_{42}N_8S_4O_8$ of: C, 62.08; H, 3.90; N, 10.34.

EXAMPLE III 2,3,11,12-tetraamino-diquinoxal(2,3-e, 2′,3′-1)pyrene

To 150 ml. of concentrated sulfuric acid there is added 10.8 g. (10.0 mmoles) of 2,3,11,12-tetra(p-toluenesulfamido)diquinoxal(2,3-e, 2′,3′-1)pyrene. The solution is stirred at room temperature for six hours, cooled to 0° C. and poured over ice to precipitate a dark red solid. The red material is collected, washed with water, and added to a deoxygenated 20% ammonium carbonate solution to give a light yellow solid. The free amine is collected, washed with deoxygenated water, dried under reduced pressure, and recrystallized from dimethylacetamide to afford 4.43 g. (95%), M.P. >300° C. Analyses show: C, 71.26; H, 3.97; N, 24.10; as compared to theoretical values for $C_{28}H_{18}N_8$ of: C, 72.08; H, 3.89; N, 24.02.

EXAMPLE IV

Polymer from 1,4,5,8-naphthalenetetracarboxylic acid

To 50 g. of deoxygenated polyphosphoric acid there is added, under a nitrogen atmosphere, 0.1543 g. (0.453 mmole) of 1,4,5,8-naphthalenetetracarboxylic acid and 0.2117 g. (0.453 mmole) of 2,3,11,12-tetraamino-diquinoxal(2,3-3, 2′,3′-1)pyrene. The mixture is heated at the rate of 3° C./minute to 180° C. and maintained at that temperature for 10 hours. The solution is then allowed to cool to 30° C. and the polymer is precipitated into 500 ml. of anhydrous methanol. The isolated material is dissolved in methane sulfonic acid and reprecipitated into anhydrous methanol. The product, 0.29 g. (99%), has an inherent viscosity of 0.36 dl./gm. in methane sulfonic acid (0.3 g./100 ml. at 30° C.). Analyses show: C, 72.76; H, 2.22; N, 16.42; as compared to theoretical values for $(C_{42}H_{14}N_8O_2)$ of: C, 76.12; H, 2.12; N, 16.91.

EXAMPLE IVa

Polymer from the tetratosylate of the tetraamino

To 100 g. of deoxygenated polyphosphoric acid is added, under a nitrogen atmosphere, 2.226 g. (0.212 mmole) of 2,3,11,12-tetra(p-toluenesulfamide)diquinoxal(2,3-e, 2′,3′-1)pyrene. The mixture is heated to 80° C. and maintained at that temperature for 8 hours. The dark blue solution is allowed to cool to room temperature and 0.64 g. (0.212 mmole) of 1,4,5,8-naphthalenetetracarboxylic acid is added. The mixture is then heated at the rate of 3° C./minute to 180° C. and held at that temperature for 10 hours. After the mixture has cooled to room temperature, it is precipitated into 1 liter of anhydrous methanol. The material is collected, washed with methanol, dried under reduced pressure, and reprecipitated from methane sulfonic acid. The polymer, 1.3 g. (94%), has an inherent viscosity of 0.70 dl./g. in methane sulfonic acid (0.3 g./100 ml. at 30° C.).

*Analysis.*—Calculated for $(C_{42}H_{14}N_8O_2)$, percent: C, 76.12; H, 2.12; N, 16.91. Found (percent): C, 75.69; H, 2.15; N, 16.64.

EXAMPLE V

The procedures of Examples IV and IVa are repeated a number of times using individually, in place of the naphthalenetetracarboxylic acid, equivalent weights respectively of the dianhydrides of:

(a) 1,2,4,5-benzene tetracarboxylic acid;
(b) 1,2,5,6-naphthalene tetracarboxylic acid;
(c) 1,2,6,7-pyrene tetracarboxylic acid; and
(d) o,o,o′,o′-Diphenyl tetracarboxylic acid.

In each case ladder polymers are obtained.

EXAMPLE VI

The procedure of Example IVa is repeated a number of times with similar polymers being produced using individually in place of the tetratosyl derivative of the tetraamino pyrene compound, an equivalent weight respectively of a number of corresponding compounds in which the tosyl groups are:

(a) p-Toluenesulfamide
(b) Benzenesulfamide
(c) Benzylsulfamide
(d) Methylsulfamide
(e) Cyclohexylsulfamide
(f) p-Chlorobenzenesulfamide
(g) Naphthalenesulfamide

EXAMPLE VIa

The procedure of Example IV is repeated a number of times with similar polymers being produced using individually in place of the tetraamino pyrene compound, an equivalent weight respectively of the following derivatives of the tetraamino pyrene compound:

(a) The tetrahydrochloride salt
(b) The tetraphosphate salt
(c) The tetrasulfate salt

EXAMPLE VII

The procedure of Example IV is repeated a number of times with similar polymers being produced using individually in place of the polyphosphoric reaction medium an equal weight respectively of the following:

(a) Dimethylformamide
(b) Dimethylacetamide
(c) Hexamethylphosphoramide
(d) Tetramethyl urea
(e) Dimethyl sulfoxide

EXAMPLE VIII

The procedure of Example I is repeated a number of times with similar results using individually in place of the dinitro - di(p - toluenesulfamido)benzene an equivalent weight respectively of the following ditosyl derivatives:

(a) 1,2-dinitro-4,5-(benzenesulfamido)benzene
(b) 1,2-dinitro-4,5-(benzylsulfamido)benzene
(c) 1,2-dinitro-4,5-(methylsulfamido)benzene
(d) 1,2-dinitro-4,5-(cyclohexylsulfamido)benzene
(e) 1,2-dinitro-4,5-(p-Cl-benzenesulfamido)benzene
(f) 1,2-dinitro-4,5-(napthalenesulfamido)benzene

EXAMPLE IX

The procedure of Examples IV and IVa are repeated a number of times using individually, in place of the naphthalenetetracarboxylic acid, equivalent weight respectively of (a) 3,4,9,10-perylenetetraacid
(b) Pyrazinetetraacid
(c) 3,4,3′,4′-diphenyltetraacid
(d) 3,4,3′,4′-diphenyloxidetetraacid
(e) 3,4,3′,4′-diphenylketonetetraacid
(f) The corresponding dianhydrides of (a), (b), (c), (d) and (e)

Ladder polymers are obtained with (a) and (b), but less rigid polymers are obtained with (c), (d) and (e).

In the repeating unit structure of Formula III given above for the polymers of this invention, the polymers produced in Examples IV, V and IX have the following respective structures for the tetravalent Ar radical:

Ex. IV:

Ex. V (a):

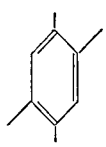

Ex. V(b):

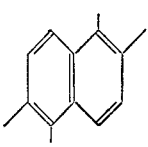

Ex. V(c):

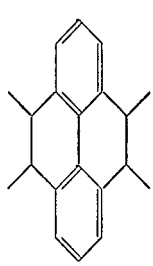

Ex. V(d):

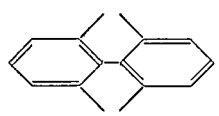

Ex. IX(a)

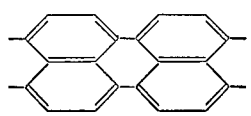

Ex. IX(b):

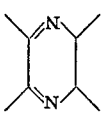

Ex. IX(c):

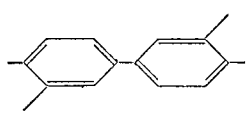

Ex. IX(d):

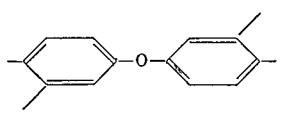

Ex. IX(e):

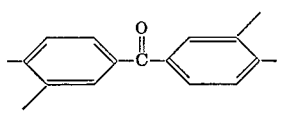

The invention claimed is:
1. A heat resistant polymer consisting essentially of repeating units of the formula:

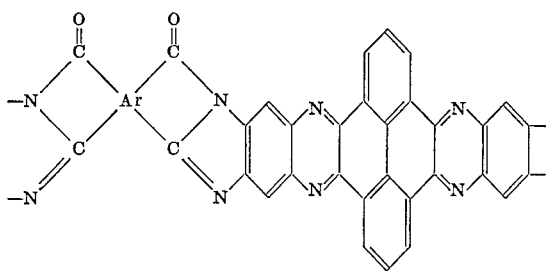

wherein Ar is a tetravalent aromatic radical.

2. The polymer of claim 1 in which the Ar represents a naphthalene tetravalent radical having the formula:

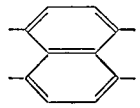

3. The polymer of claim 1 in which said Ar radical represents a benzene tetravalent radical having the formula:

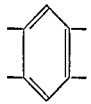

4. The polymer of claim 1 in which said Ar represents a pyrene tetravalent radical having the formula:

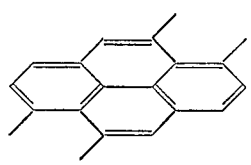

5. The polymer of claim 1 in which said Ar represents a perylene tetravalent radical having the formula:

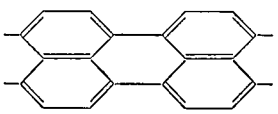

6. The polymer of claim 1 in which said Ar represents a pyrazine tetravalent radical having the formula:

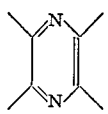

7. The polymer of claim 1 in which said Ar represents a diphenyl tetravalent radical having the formula:

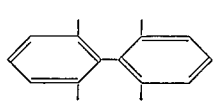

8. A process for preparing a polymer of improved heat resistance comprising the steps of mixing and reacting an aromatic tetracarboxylic acid with 2,3,11,12-tetraamino-diquinoxal-(2,3-e,2',3'-l)pyrene in an inert atmosphere at a temperature of 30–200° C. for a period of at least eight hours.

9. A process for preparing a polymer of improved heat resistance comprising the steps of mixing and reacting an aromatic tetracarboxylic acid with a pyrene derivative having four free amino groups thereon and represented by the formula:

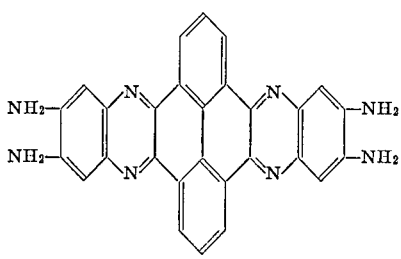

10. The process of claim 9 in which the said pyrene derivative is selected from the class consisting of the pyrene in the free amine form and an inorganic acid salt thereof, and the polymerization is conducted in polyphosphoric acid.

11. The process of claim 10 in which said pyrene tetraamino derivative is in the form of the tetratosylate.

12. The process of claim 9 in which said pyrene tetra-amino derivative is in the form of the free amino compound and the reaction is conducted in an aprotic solvent.

References Cited

UNITED STATES PATENTS

| | | | |
|---|---|---|---|
| 3,347,808 | 10/1967 | Lavin et al. | 260—78X |
| 3,387,058 | 6/1968 | Levine | 260—78X |
| 3,435,004 | 3/1969 | Hathaway et al. | 260—78X |
| 3,414,543 | 12/1968 | Paufler | 260—78X |

WILLIAM H. SHORT, Primary Examiner

H. SCHAIN, Assistant Examiner

U.S. Cl. X.R.

260—47, 65, 250